US006708107B2

(12) United States Patent
Impson et al.

(10) Patent No.: US 6,708,107 B2
(45) Date of Patent: Mar. 16, 2004

(54) REAL-TIME AD HOC TRAFFIC ALERT DISTRIBUTION

(75) Inventors: Jeremy D. Impson, Vestal, NY (US); Nader Mehravari, Ithaca, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/114,167

(22) Filed: Apr. 2, 2002

(65) Prior Publication Data

US 2003/0187570 A1 Oct. 2, 2003

(51) Int. Cl.$^7$ ................................................. G06G 7/76
(52) U.S. Cl. ....................... 701/117; 701/118; 701/119; 340/905
(58) Field of Search ................................. 701/117, 118, 701/119; 180/167, 168, 169; 340/905

(56) References Cited

U.S. PATENT DOCUMENTS

| | | | |
|---|---|---|---|
| 5,164,904 A | 11/1992 | Sumner | 701/117 |
| 5,206,641 A | 4/1993 | Grant et al. | 340/905 |
| 5,313,200 A | 5/1994 | Sone | 340/905 |
| 5,428,544 A | 6/1995 | Shyu | 701/117 |
| 5,428,545 A | 6/1995 | Maegawa et al. | 701/210 |
| 5,539,645 A | 7/1996 | Mandhyan et al. | 701/119 |
| 5,589,827 A | 12/1996 | Scurati | 340/901 |
| 5,592,172 A | 1/1997 | Bailey et al. | 342/350 |
| 5,621,798 A | 4/1997 | Aucsmith | 380/271 |
| 5,890,054 A | 3/1999 | Logsdon et al. | 455/11.1 |
| 5,899,953 A | 5/1999 | Urahashi | 701/117 |
| 6,092,020 A | 7/2000 | Fastenrath et al. | 701/119 |
| 6,150,961 A | 11/2000 | Alewine et al. | 340/995 |
| 6,249,232 B1 | 6/2001 | Tamura et al. | 340/902 |
| 2002/0030611 A1 * | 3/2002 | Nuesser et al. | 340/992 |
| 2003/0009278 A1 * | 1/2003 | Mallet et al. | 701/120 |

OTHER PUBLICATIONS

Kelley, David, *Using US Standards for traveler information within the WWW*, Feb., 2000, Workshop of Position Dependent Information Services, W3C Mobile Access Interest Group, www.w3.org/mobile/posdep/sae_www_position.html.

*Introduction to Wireless LANs*, WLANA: The Wireless LAN Alliance, www.wlana.com, St. Simons Island, GA 31522, info@wlana.com.

* cited by examiner

Primary Examiner—Marthe Y. Marc-Coleman
(74) Attorney, Agent, or Firm—Perkins, Smith & Cohen LLP; Jacob N. Erlich; Kathleen Chapman (57) ABSTRACT

A traffic characterization system and method of use for executing a traffic characterization protocol over an ad hoc communications network. Conventional in-vehicle computers and conventional wireless local area network (LAN) transceivers host the traffic characterization system and the messages generated by the system. As a traffic jam occurs, the mobile units send out traffic characterization data in a sequence activated by the content of the messages and traffic characterization protocol of the present invention. All vehicles participating in the traffic characterization system and approaching the traffic jammed area receive the characterization data and have the opportunity to route around the jam.

19 Claims, 7 Drawing Sheets

REAL-TIME AD HOC TRAFFIC ALERT DISTRIBUTION

BACKGROUND OF THE INVENTION

This invention relates generally to inter-vehicle information transfer and, more particularly to an automatic inter-vehicle traffic condition message protocol.

Traffic hazards and overcrowding on highways are aggravated by the fact that drivers about to enter a jammed area of highway cannot take alternate routes to avoid such jams. By the time they are aware of a traffic jam, it is often too late to do anything but wait for the jam to clear. The most ubiquitous solutions in existence use news alerts (typically via the radio). Wireless devices capable of accessing the internet also alert drivers to traffic jams through on-line traffic reporting web sites. In general these are handheld and are becoming generally not appropriate for an in-vehicle use because they demand the driver's attention.

Traffic jam alerts that come across a radio are the result of a drivers' calls that report traffic conditions, or the result of helicopter reports. Both of these reporting mechanisms rely on human observations of a snapshot of the traffic situation. Only conditions that happen at the moment are reported. Traffic jams occur (and disappear) spontaneously, and so change the particular conditions, and if the radio is not turned on, the driver might not have any awareness of even the most up-to-date information.

Even if a driver is alerted to a traffic jam enroute soon enough to take measures to avoid the jam, the driver may not be familiar with the area, and may have no knowledge of potential detours around the jam. Furthermore, not all roads are monitored. On-line web sites combined with wireless devices allow the driver to be alerted to traffic incidents, but the problem of getting accurate up-to-date reports of constantly changing conditions remains.

Real-time traffic information can be collected by vehicles on the road. This information can be exchanged among vehicles. Vehicle-to-vehicle data communications mainly consist of the continuous, routine exchange of telemetric data such as vehicle status, speed, and acceleration. An ad hoc network can be formed of these vehicles as they travel on the road in the vicinity of one another and exchange information. Their electronic signals can travel over, for example, independent wireless local area network (LAN) communication systems. Wireless LANs use radio and infrared airwaves to communicate information from one point to another without relying on any physical connection. Independent wireless LANs connect Personal Computers (PCs) through wireless adapters. Any time two or more wireless adapters are within range of each other, they can set up an independent network. These on-demand networks typically require no administration or preconfiguration.

An ad hoc network is one in which mobile units interact with one another without a centralized infrastructure. Another characteristic of an ad hoc network is that mobile units may not continuously remain in range of each other, thus the topology of the network is maximally dynamic. This characteristic alone makes the transmission of extensive amount of administrative information among mobile units infeasible.

Many protocols support ad hoc networking. The main differences among the protocols are the amount of administrative overhead and the presence or absence of transmission loops in which a packet moves infinitely around the network. Examples of ad hoc networking protocols are the Destination-Sequenced Distance-Vector (DSDV) protocol, Dynamic Source Routing (DSR), and Ad Hoc On-Demand Distance Vector (AODV) routing protocol. In DSDV protocol, route tables are stored at each node, and each node periodically transmits updates often enough so that every mobile computer can locate every other mobile computer in the collection. The DSR protocol is designed for multihop wireless ad hoc networks of mobile nodes in which the nodes can move continuously and at any time, but the speed with which they move is moderate relative to the packet transmission latency and wireless transmission range of the network hardware. In the AODV routing protocol routes are discovered on an as-needed basis and are maintained only as long as necessary.

Standards are currently being developed to govern the protocol exchange and message format among vehicles in an ad hoc network. Multiple levels of protocols are required to support sophisticated communications among vehicles. Physical device handshaking occurs at one protocol level, while data packaging handshaking occurs at another. Still another level can involve the "protocol" of the sequence of messages, acknowledgements, and error paths that enable cooperative operation among participants in the ad hoc network.

Three U.S. standards relevant to delivering to the mobile traveler real-time information about the current and predicted roadway conditions, the weather, etc. are being developed. All involve various types of position-location information transported electronically. All are message formatting standards, rather than presentation standards. All provide a message structure definition, but do not specify content or quality of data, or the presentation of the data. J2353 (a data dictionary standard) and J2354 (a message set standard inside of which is link data consisting of congestion and speed data) are targeted to individual traveler needs These standards specify the transactional messages needed to exchange a profile and receive back current or on-going status of relevant roadway events. J2369 (a reduced bandwidth standard) was developed for broadcast use, and also for use over reduced bandwidth media hosts such as are typical of mobile systems. In this context, broadcast implies that the function of discarding non-relevant information (e.g. traffic events outside of the traveler's concern) is left to the client side device.

U.S. Pat. No. 5,621,798 discloses a wireless cooperative messaging network. In this network each unit that can send or receive messages is used as a transmitter/receiver station for the network. Periodically, messages are transmitted or retransmitted from each mobile unit to the others and possibly to a central receiving/transmitting station. Messages are tagged by time and unique identifier. Each vehicle is assigned a transmission window in this system.

U.S. Pat. No. 5,428,544 discloses a system in which vehicular information is interchanged among vehicles traveling along a highway. This information includes speed and direction of the vehicle, and other information that could be processed by other vehicles to determine the local traffic situation. The exchanged data are processed by an on-board computer that interprets the positions of the other vehicles and applies techniques to assess the traffic situation. Traffic information that is exchanged is "raw data", that is, the on-board computer must apply interpretation of the data to determine traffic conditions. Examples of data exchanged are coordinates of several points passed by the sending vehicle and average driving speed and longest halting time between the points.

U.S. Pat. No. 6,092,020 discloses a system that collects individual reports from "floating cars", the reports being transmitted to and interpreted by a central location. Traffic jams in this system are identified by characteristic fluctuations in speed. In this system, threshold values of speed are set, and when these thresholds are crossed, a traffic situation is inferred and transmitted to a central receiving station.

What is needed is real-time traffic characterization information that is collected and shared by vehicles traveling in the vicinity of one another. A vehicle collecting such information could automatically suggest rerouting to the vehicle's operator should a traffic jam be detected. Combined with a mapping and route planning system, dynamic adjustments to a vehicle operator's route could be made automatically, so the operator would not need any knowledge of the travel area (and thus of any potential detours).

SUMMARY OF THE INVENTION

The problems set forth above as well as further and other problems are solved by the present invention. The solutions and advantages of the present invention are achieved by the illustrative embodiment of the invention described hereinbelow.

The system of the present invention comprises (1) a traffic characterization protocol operating on an ad hoc communications network among cooperating mobile units, the protocol serving to sequence the flow of traffic characterization data among cooperating mobile units, and (2) a traffic characterization data detection, reception, and computation system that enables the identification of geographic areas of traffic concern. Utilizing conventional in-vehicle computers and conventional wireless LAN transceivers, a plurality of vehicles so equipped, and further containing the system of the present invention, can form an ad hoc distributed realtime traffic condition alert mechanism. As a traffic jam occurs, the vehicles send out traffic characterization data in a sequence defined by the message content and traffic characterization protocol of the present invention. Nearby vehicles receive these data and possibly retransmit them to other vehicles, according to the traffic characterization protocol. All vehicles approaching the traffic jammed area receive the characterization data and have the opportunity to route around the jam.

The method of the present invention includes the steps of initializing the in-vehicle system located in a mobile unit of the present invention, listening for messages, transmitting traffic characterization data messages periodically over an ad hoc network, receiving traffic characterization data messages from the ad hoc network, processing messages received from the ad hoc network according to the traffic characterization protocol of the present invention, updating an internal traffic condition database according to messages received from the ad hoc network, and testing for change in status of the mobile unit and updating the traffic condition database accordingly.

For a better understanding of the present invention, together with other and further objects thereof, reference is made to the accompanying drawings and detailed description and its scope as pointed out in the appended claims.

DETAILED DESCRIPTION OF THE INVENTION

Figure 1:
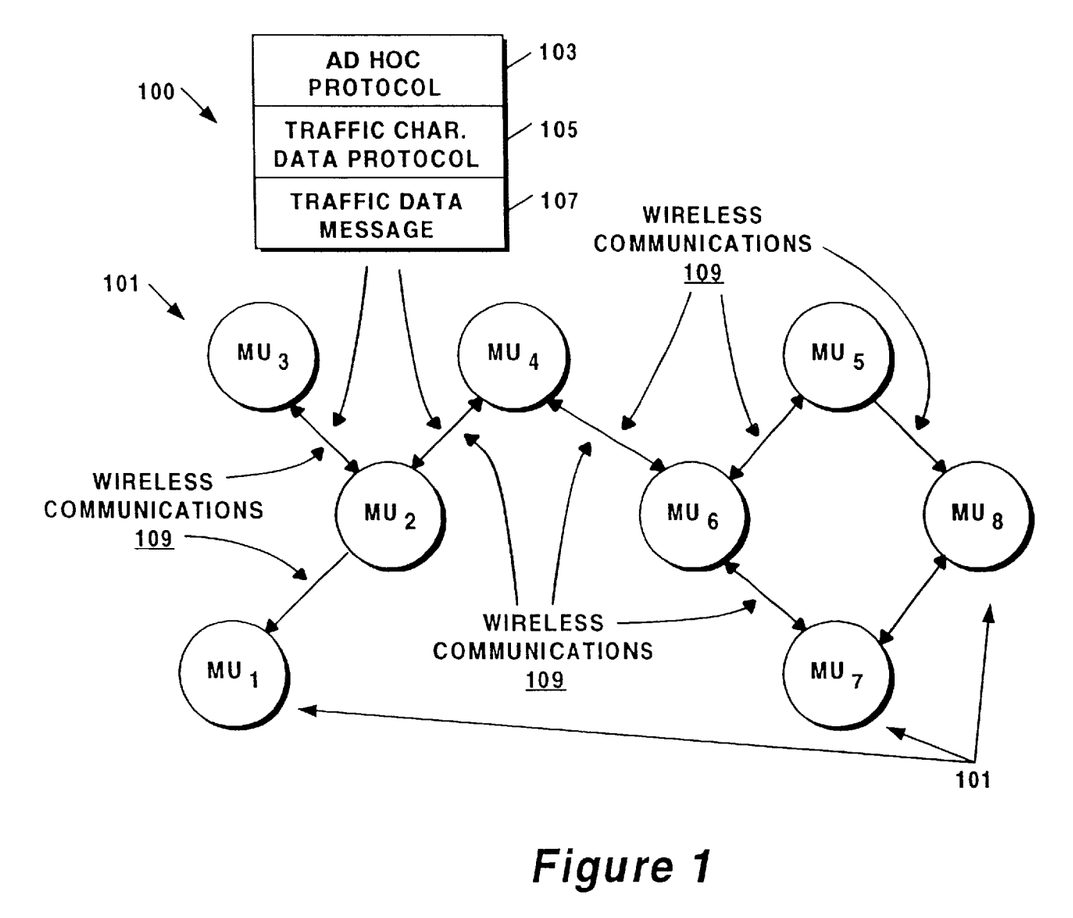
FIG. 1 is a network diagram of an ad hoc network formed by the mobile units of the illustrative embodiment of the present invention.

Referring to FIG. 1, in the illustrative embodiment of the present invention, mobile units 101 form an ad hoc network 100. Mobile units 101 communicate with each other through in-vehicle wireless communications systems 109 under the control of an ad hoc protocol 103. Traffic data messages 107 flow through network 100, moving traffic characterization data among mobile units of the ad hoc network 100 under the control of traffic characterization data protocol 105.

Figure 2:
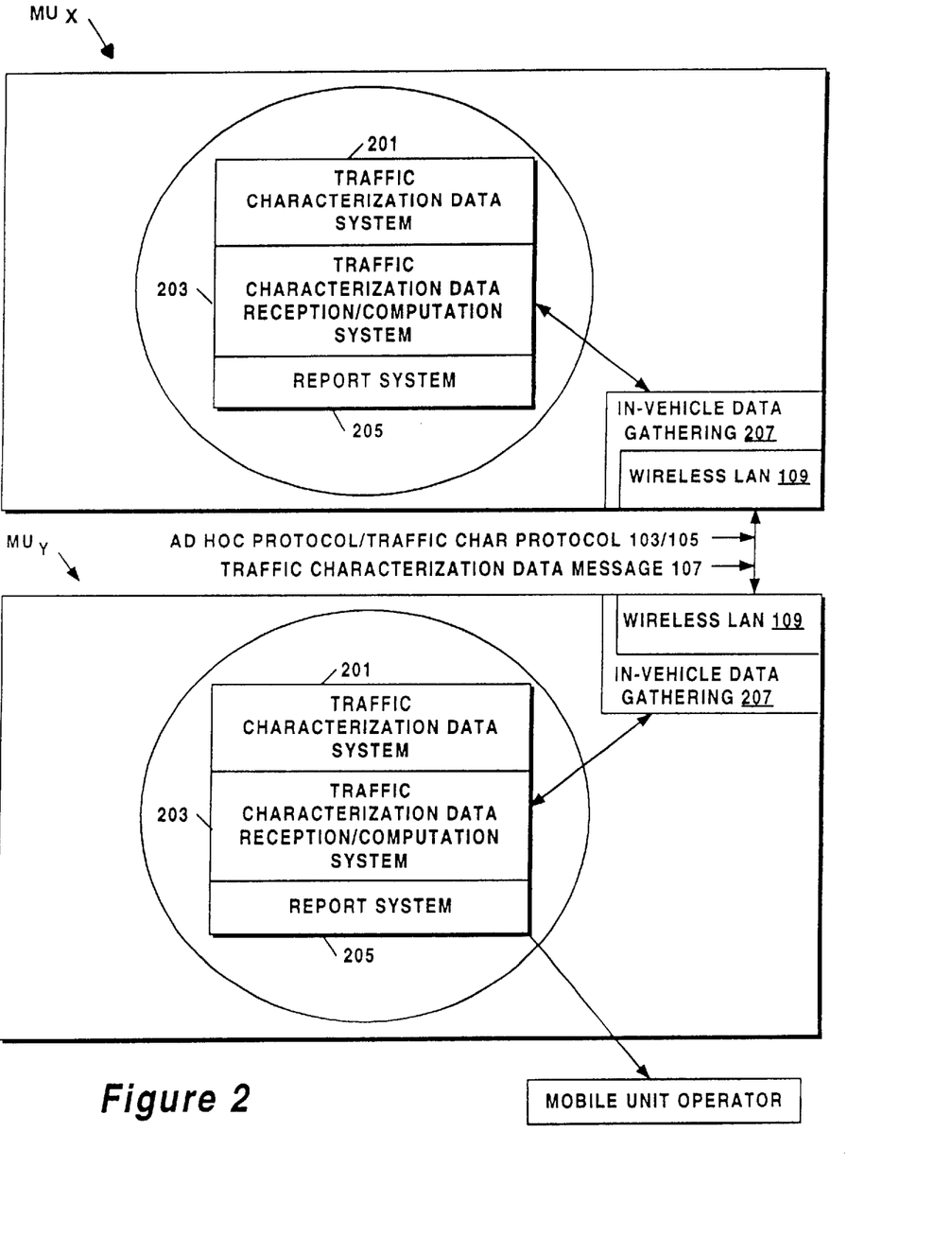
FIG. 2 is a schematic diagram showing the major components of two illustrative communicating mobile units of the ad hoc network of the illustrative embodiment of the present invention.

Mobile units 101 in the illustrative embodiment include systems to support the flow of traffic characterization data as shown in FIG. 2. In particular, a traffic characterization protocol 105 governs the sequencing the flow of traffic characterization data messages 107 by sequencing the execution of a traffic characterization data reception/computation system 203. At any time, a report system 205 may require traffic characterization data to inform the mobile unit operator of traffic jam conditions. Traffic characterization data are gathered from in-vehicle data gathering means 207 and from neighboring mobile units through, in the illustrative embodiment, wireless LAN communications 109.

Figure 3:
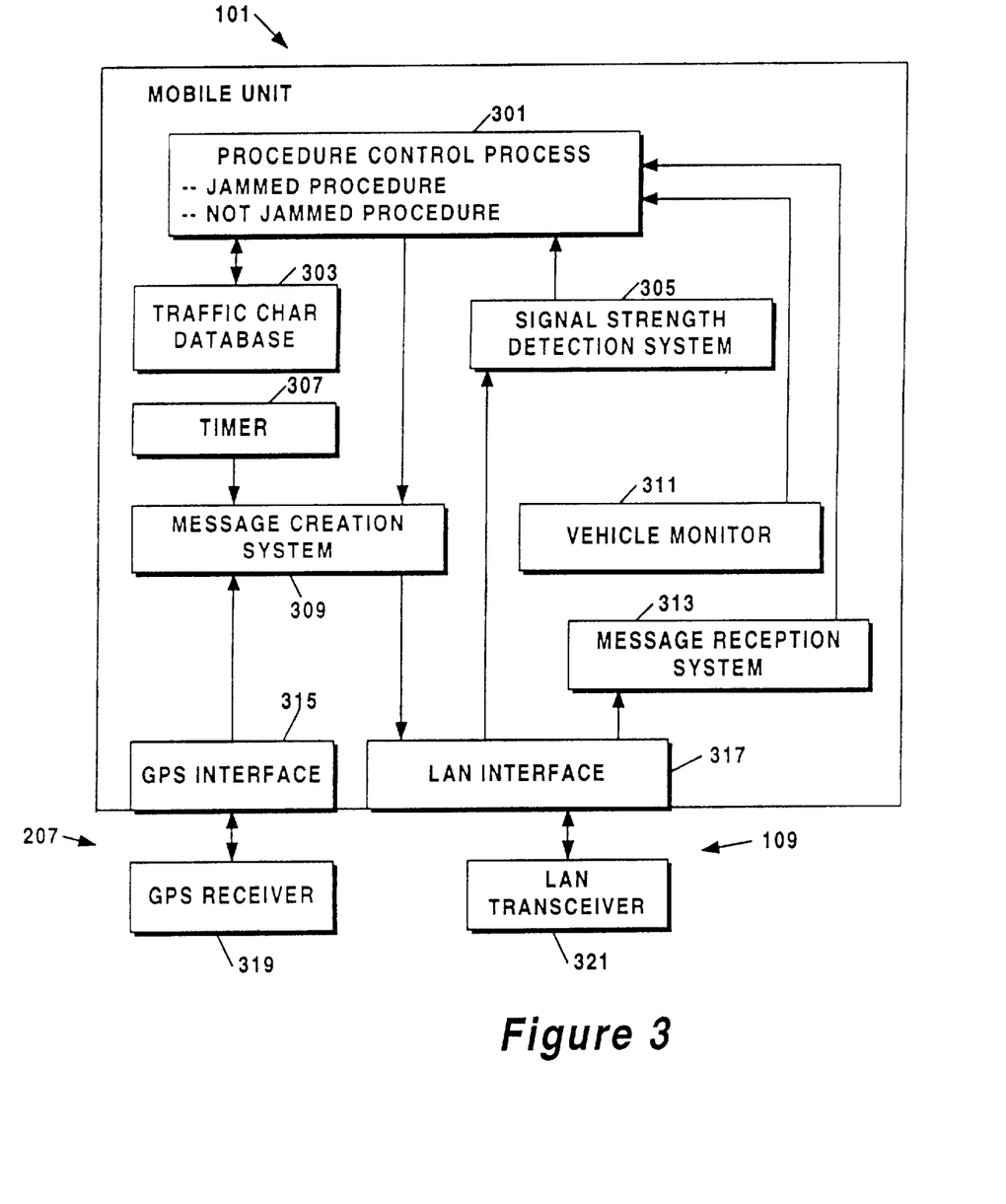
FIG. 3 is a schematic block diagram of the systems that implement the major components of a mobile unit of the illustrative embodiment of the system of the present invention.

Mobile unit components are further detailed in FIG. 3. Traffic characterization data protocol system 201 includes, in the illustrative embodiment, a procedure control system 301 that retains status information for itself and other mobile units in a traffic characteristics database 303. Control system 301 manages the flow of traffic characterization data during JAMMED and UNJAMMED status conditions.

A traffic characterization data reception/computation system 203 receives, creates, and transmits traffic characterization data. The data system 203 includes a message reception system 313 that receives and unpacks a traffic characterization data message 105 from the ad hoc network through a LAN interface 317 and LAN receiver 321 system (wireless LAN communications 109). At the same time, a signal strength detection system 305 determines a signal strength for the incoming message. The protocol system 201 uses this information to decide whether or not to retransmit the incoming message to other mobile units in the ad hoc network, so the signal strength information is fed directly to the procedure control system 301. The procedure control system 301 might retain data from the incoming message, such as the location of the source mobile unit and the traffic characterization from the point of view of that mobile unit, in database 303 for later preparation of a complete traffic picture.

While the mobile unit receives traffic data messages, it is also self-sensing pre-defined conditions that could indicate traffic congestion. In the illustrative embodiment, a vehicle monitoring system 311 can detect speed differential of the mobile unit 101 as well as other real-time attributes. If the mobile unit is slowing or stopped, the vehicle speed monitor passes this information to the procedure control system 301 which relates differential speed to traffic characterization data. The traffic characterization data in the illustrative embodiment take the form of a vehicle status that can either be JAMMED or UNJAMMED. As will be later seen, vehicle status determines traffic characterization data protocol sequencing.

Figure 5:
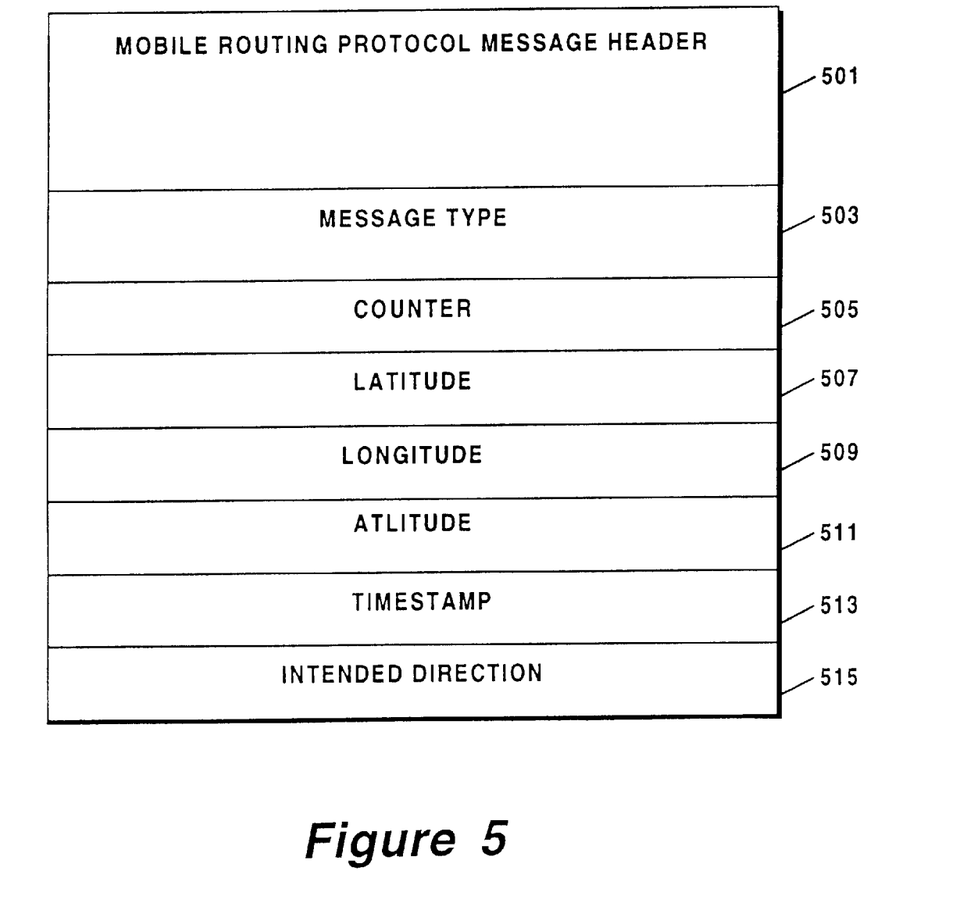
FIG. 5 is a layout diagram of the traffic characterization data message understood by the traffic characterization data protocol of the illustrative embodiment of the present invention.

According to the traffic characterization protocol, the mobile unit must send to the ad hoc network periodic traffic characterization communications messages. Thus, the data system 203 includes a timer to periodically schedule execution of the message creation system 309. The message creation system 309 gathers mobile unit location data from a GPS interface 315 which receives location information from GPS receiver 319. The message creation system combines 309 these location data with traffic characterization data in a pre-defined message format as shown in FIG. 5. The message creation system 309 transmits the traffic data message through wireless LAN communications 109.

Figure 4:
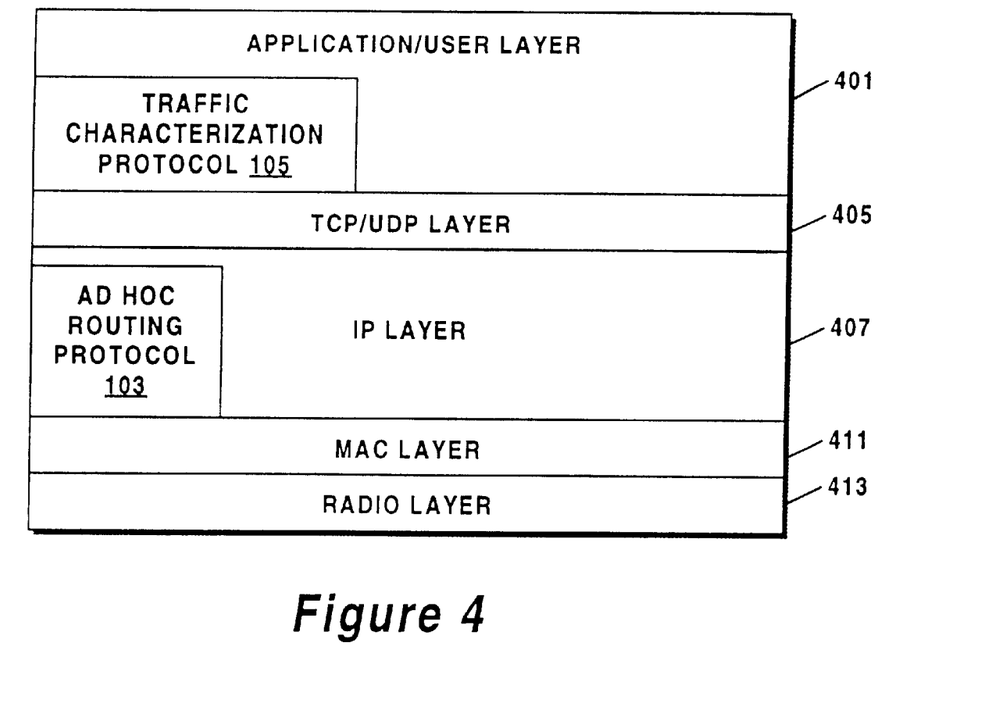
FIG. 4 is a layout diagram of the TCP/IP layers including the possible positioning of an ad hoc protocol implementation and the traffic characterization data protocol implementation in the illustrative embodiment of the present invention.

Referring now to FIGS. 4 and 5, the traffic characterization data message 107 includes a message header 501 that conforms in format, to an ad hoc protocol 103. Any protocol that supports ad hoc networking, as described above, can suitably be used to reliably transfer traffic characterization data messages 107. Network protocols are implemented in layers as shown in FIG. 4. At the physical interface is a "radio layer" 413 that converts incoming signals from physical devices into a digital representation. Next is the Medium Access Control layer 411 that interprets the order of the digital signals by device. The Internet Protocol layer 407 uses a set of rules to exchange messages among mobile units at the Internet address level. It is at this level that an ad hoc routing protocol 409 might be implemented. The next layer, the Transmission Control Protocol layer 405, uses a set of rules to exchange messages with other mobile units at the communications packet level. Finally, the applications/user layer 401 uses a set of user-defined rules to process complete messages in an application-specific way. At this layer, the traffic characterization data protocol 105 might be implemented.

Communications message traffic characterization data fields in the illustrative embodiment are the message type 503, latitude 507, longitude 509, and timestamp 513. Loop prevention is enabled in the illustrative embodiment by a field referred to as counter 505. Other data exchanged among mobile units of the illustrative embodiment include altitude 511 and intended direction 515. In the illustrative embodiment, communications messages are formatted as shown in FIG. 5, but any variation of this format, if understood by participating mobile units, is acceptable.

Figure 6:
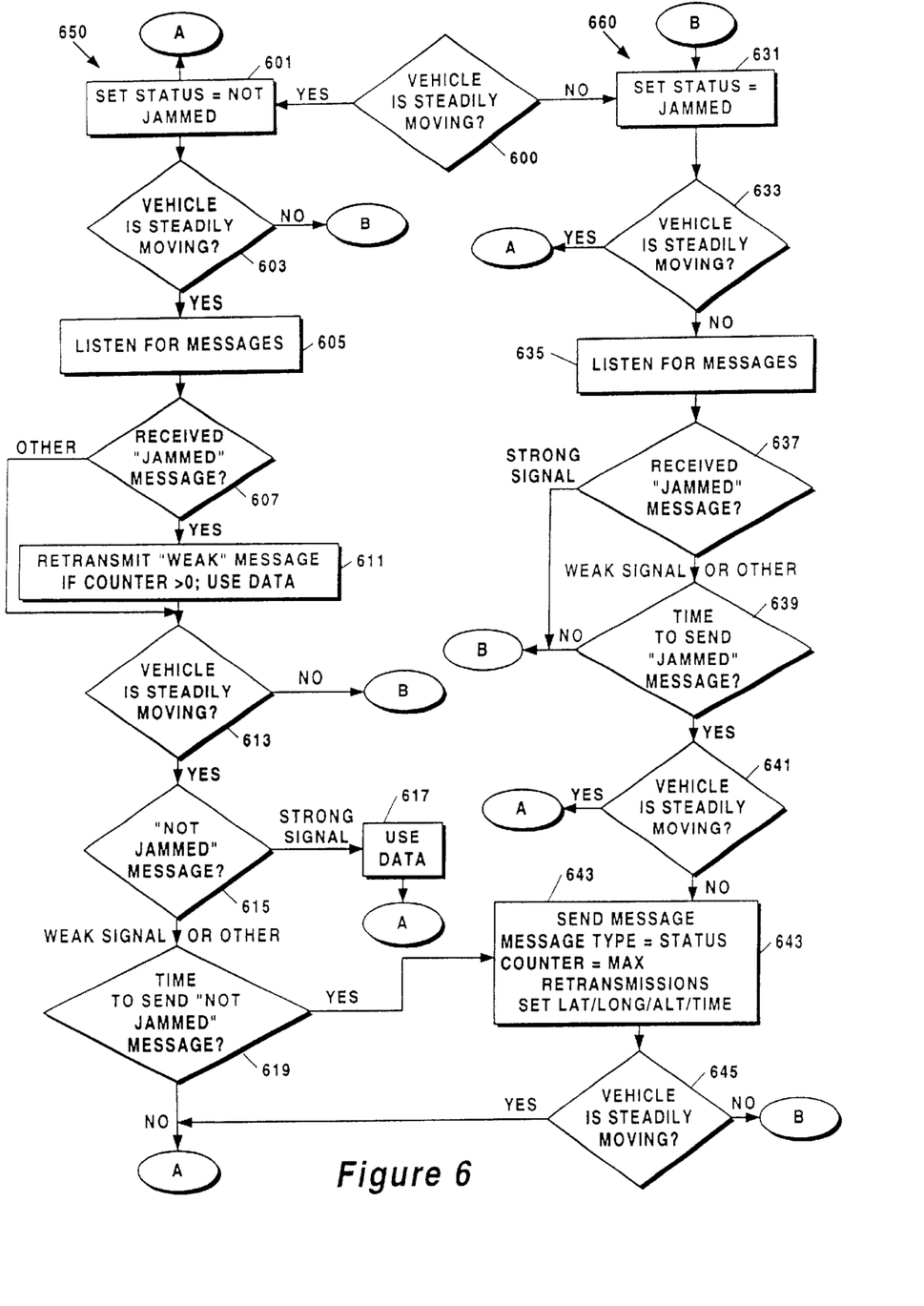
FIG. 6 is a flow diagram of the sequence of steps taken by the traffic characterization data protocol of the illustrative embodiment of the present invention.

The traffic characterization protocol is shown in FIG. 6. Following initialization of mobile unit 101, and start-up of GPS and LAN devices, vehicle movement, as detected by vehicle monitor 311, is determined (method step 600). If the vehicle is steadily moving, i.e. the vehicle is not slowing or stopped, the mobile unit 101 enters the NOT JAMMED procedure 650 in which the first step is that the traffic characterization status ("status") is set by procedure control system 301 to NOT JAMMED (method step 601). Once again, the status of the vehicle's movement is tested (decision step 603). If the vehicle continues to steadily move, the message reception system 313 begins listening for messages. In the illustrative embodiment, two types of messages are expected, "JAMMED" and "NOT JAMMED", although others may be received, or no message at all may be received. If no message is received and the timer system 307 indicates that the timer has expired, the NOT JAMMED procedure 650 continues as if a message were received of unknown type. This mechanism forces periodic attempts to link up with others who may be coming into the ad hoc network. Further, messages of varying signal strengths may be received, as detected by signal strength detection system 305. If a message is received below a pre-defined signal strength threshold, as determined by decision steps 607, 615, and 637, the message is deemed a "weak" message, and special processing occurs as shown in method steps 611, 619, and 639. The differentiation between messages arriving with varying signal strengths insures that the weaker signals will be retransmitted, but also insures that the network will not be flooded with retransmissions of unnecessary messages. While no messages are being received into the mobile unit 101, timer 307 is incrementing a timer that may be tested by decision steps 619 and 639 so that periodic messages may be sent as shown in method step 643. Periodic messages maintain links among members of the ad hoc network without flooding the network with, for example, a steady stream of status and location messages.

Continuing with the traffic characterization protocol at method step 605 in which the vehicle is in NOT JAMMED state, when a message arrives, if the message is a "weak" JAMMED message (decision step 607), the counter 505 within the message is checked. If the counter is zero, the message has been retransmitted the maximum number of times allowed by the protocol. The message is not retransmitted. Otherwise, the message is retransmitted after the counter is decremented (method step 611). If the received message is a JAMMED message (decision step 607), the data, such as position of the vehicle that transmitted the message, are used or saved for use in traffic calculations outside the scope of this invention (method step 611). A vehicle in the NOT JAMMED state uses the location and direction information from all JAMMED messages it receives (regardless of signal strength) to its best advantage Combining these data with Geographical Information Systems, the mobile unit 101 can determine if the traffic jam is on its route, and reroute accordingly.

Again the status of the vehicle's motion is tested (decision step 613). If the vehicle is still in steady motion, its status, NOT JAMMED, remains and further tests are done on the incoming message. If the message is a "strong" signal NOT JAMMED message (decision step 615), the data are used and/or saved (method step 617), and the NOT JAMMED procedure 650 begins again. The mobile unit 101 can use data from other NOT JAMMED messages to double check its decisions regarding where the locations of jams are. This is especially useful if a traffic jam occurs in one direction only of a two-direction road.

If the message is a "weak" signal NOT JAMMED message or another kind of message, a check with timer system 307 is made to determine if it is time to send out a periodic NOT JAMMED message (decision step 619). If the timer has expired, a message is sent (method step 643). The message includes message type NOT JAMMED (which is the current status of the vehicle), the position of the vehicle, and the retransmission counter set to a predetermined maximum number of allowed retransmissions. If the vehicle motion status has not changed (decision step 645), after the message is sent, control is returned to the beginning of the NOT JAMMED procedure 650. Otherwise, control is transferred to the JAMMED procedure 660. If the timer did not expire (decision step 619), control is immediately returned to the beginning of the NOT JAMMED procedure 650.

At several points in the procedures 650 and 660, decision steps 603, 613, 633, 641, and 645, vehicle motion status is checked. As a traffic jam occurs, the vehicles approaching or in the jam note that they have significantly slowed down or stopped. Thus the vehicle's status changes from NOT JAMMED to JAMMED, and the JAMMED procedure 660 is invoked. In this procedure, the vehicle monitor system 311 sets the traffic characterization status to JAMMED (method step 611). Next, vehicle motion status is checked (decision step 633), and if there has been a change, i.e. if the vehicle is now in steady motion, the NOT JAMMED procedure 650 is invoked. If the vehicle is still in JAMMED status, the message reception system 111 is again invoked to listen for messages. As in the NOT JAMMED procedure, if the JAMMED message timer expires, the JAMMED procedure 660 continues as though a message of unknown ("other") type is received, and thus a periodic message is forced into the system. If a "weak" signal JAMMED message is received (decision step 637), and the timer for sending JAMMED messages has expired (decision step 639), and the vehicle is still in JAMMED state (decision step 641), then a JAMMED message is transmitted (method step 643). The message type is JAMMED, the location of the vehicle is stored in the message in latitude 507, longitude 509, and altitude 511 fields, the message is timestamped in timestamp field 513, and the counter 505 is set to a predefined maximum number of allowable retransmissions. If the vehicle motion status has not changed (decision step 645), after the message is sent, control is returned to the beginning of the JAMMED procedure 660. Otherwise, control is transferred to the NOT JAMMED procedure 650.

Figure 7:
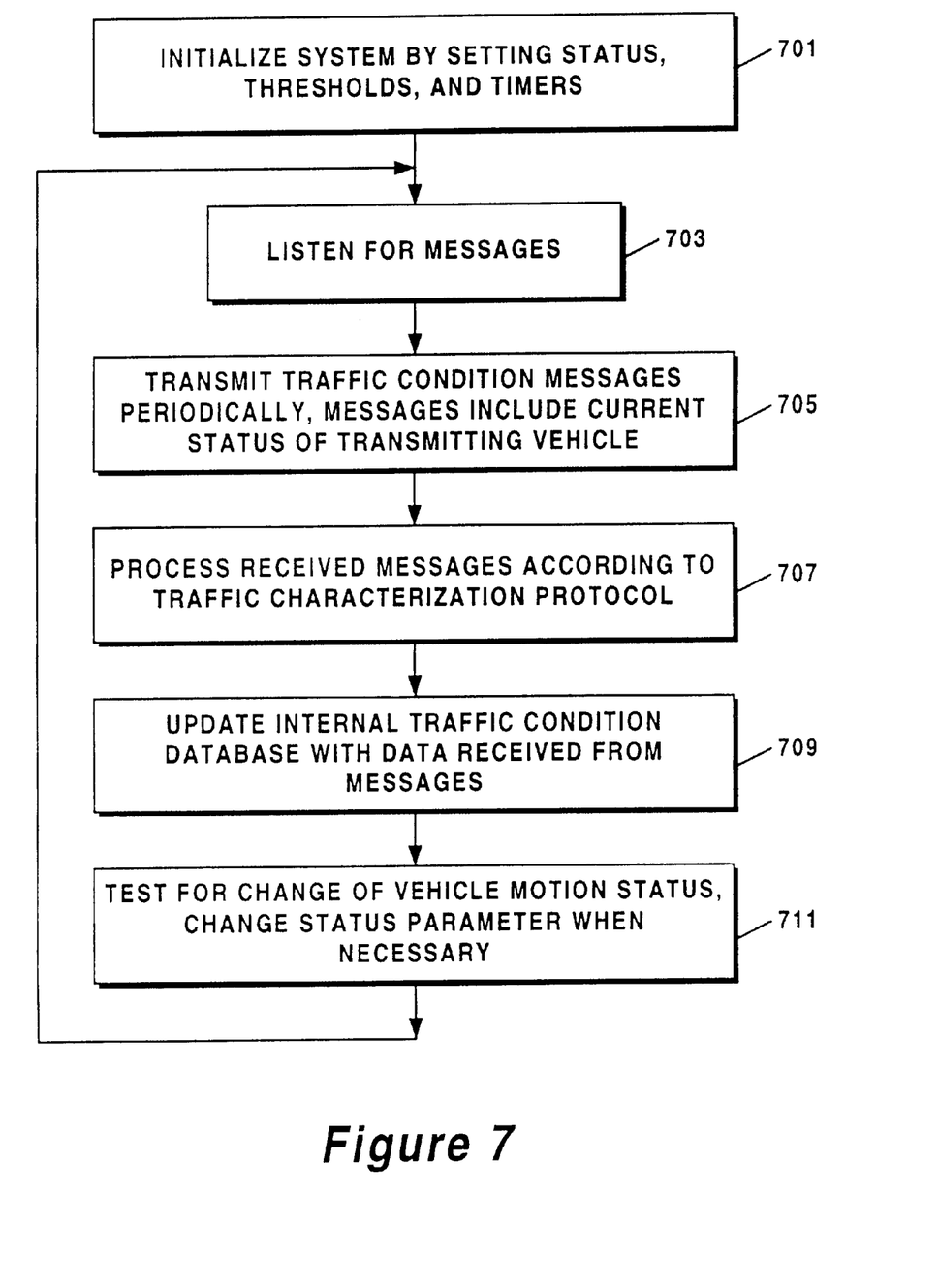
FIG. 7 is a flow diagram of the illustrative embodiment of the method of the present invention.

The method of the illustrative embodiment of the present invention is illustrated in FIG. 7. First, the mobile unit system is initialized (method step 701). The system then begins to listen for incoming messages (method step 703). Simultaneously, the system begins to transmit periodic messages containing its status information including, but not limited to, its traffic characterization status, its location, and a timestamp (method step 705). If a message is received, the system detects and processes certain types of messages specially, for example "weak" signal JAMMED messages, according to the traffic characterization protocol (method step 707). In some cases, the data from the received message are used to update mobile unit databases (method step 709). Finally, the system continually checks the vehicle motion status for changes, and executes specific procedures (procedures 650 and 660 in the illustrative embodiment) according to the traffic characterization protocol depending on the vehicle motion status (method step 711).

Although the invention has been described with respect to various embodiments, it should be realized this invention is also capable of a wide variety of further and other embodiments within the spirit and scope of the appended claims.

| Reference numbers | |
|---|---|
| ref # | meaning |
| 100 | network |
| 101 | mobile unit |
| 103 | ad hoc protocol |
| 105 | traffic characterization data protocol |
| 107 | traffic data message |
| 109 | wireless communications (LAN) |
| 201 | traffic characterization data protocol system |
| 203 | traffic characterization data reception/computation system |
| 205 | report system |
| 207 | in-vehicle data gathering |
| 301 | procedure control system |
| 303 | traffic characterization database |
| 305 | signal strength detection system |
| 309 | message creation system |
| 311 | vehicle monitor |
| 313 | message reception system |
| 315 | GPS interface system |
| 317 | LAN interface system |
| 319 | conventional GPS receiver |
| 321 | conventional local area network (LAN) transceiver |
| 401 | application/user layer |
| 403 | traffic characterization protocol |
| 405 | TCP/UDP layer |
| 407 | IP layer |
| 409 | ad hoc routing protocol |
| 411 | MAC layer |
| 413 | radio layer |
| 501 | message header |
| 503 | message type |
| 505 | counter |
| 507 | latitude |
| 509 | longitude |
| 511 | altitude |
| 513 | timestamp |
| 515 | intended direction |
| 600 | decision step |
| 601 | method step |
| 603 | decision step |
| 605 | method step |
| 607 | decision step |
| 611 | method step |
| 613 | decision step |
| 615 | decision step |
| 617 | method step |
| 619 | decision step |
| 631 | method step |
| 633 | decision step |
| 635 | method step |
| 637 | decision step |
| 639 | decision step |
| 641 | decision step |
| 643 | method step |
| 645 | decision step |
| 650 | NOT JAMMED procedure |
| 660 | JAMMED procedure |
| 701 | control flow step |
| 703 | control flow step |
| 705 | control flow step |
| 707 | control flow step |
| 709 | control flow step |
| 711 | control flow step |
| CLAIMS | CLAIM 6 IS ONLY JEREMY, THE OTHER CLAIMS ARE BOTH JEREMY AND NADER |

What is claimed is:

1. A traffic condition alert system comprising
a mobile unit having electronic connection to at least one ad hoc communications network, said mobile unit having a mobile unit status;
a communications system executing on said mobile unit, said communications system enabling a flow of communications messages across said at least one ad hoc communications network;

a mobile unit traffic characterization data system executing on said mobile unit, said mobile unit traffic characterization data system setting said mobile unit status, said mobile unit traffic characterization data system creating, transmitting, and receiving mobile unit traffic characterization data, said flow of communications messages containing said mobile unit traffic characterization data, said mobile unit traffic characterization data having a pre-defined relationship to said mobile unit status;

a mobile unit traffic characterization protocol system executing on said mobile unit, said mobile unit traffic characterization protocol system sequencing execution of said mobile unit traffic characterization data system according to said flow of communications messages and said mobile unit status; and a report system executing on said mobile unit, said report system monitoring said mobile unit status, said report system preparing an interpretation of said mobile unit status and reporting said interpretation to a user of the traffic condition alert system.

2. The traffic condition alert system as in claim 1 wherein said mobile unit comprises an in-vehicle computer.

3. The traffic condition alert system as in claim 1 wherein said communications system comprises:
   a wireless local area network (LAN) transceiver for receiving and transmitting wireless signals from said ad hoc network; and
   a LAN interface for converting said wireless signals to and from said flow of communications messages.

4. The traffic condition alert system as in claim 1 wherein said ad hoc communications network comprises more than one said mobile unit forming a plurality of said mobile units.

5. The traffic condition alert system as in claim 4 wherein said flow of communications messages comprises:
   incoming messages and outgoing messages, wherein said incoming messages and said outgoing messages include
      a message header, said header conforming to requirements of an ad hoc network protocol, said ad hoc network protocol enabling transmission of said outgoing communications messages over said ad hoc network to said plurality of mobile units;
      a message type, said message type having a pre-defined relationship to said mobile unit traffic characterization data;
      mobile unit location data, said mobile unit location data including latitude, longitude, and altitude of said mobile unit, said mobile unit location data gathered by a GPS system;
      a counter for controlling a retransmission count for said outgoing communications message; and
      a timestamp, said timestamp having a pre-defined relationship to a collection time of said mobile unit location data.

6. The traffic condition alert system as in claim 4 wherein said mobile unit traffic characterization data system further comprises:
   a communications message reception system for receiving and unpacking said incoming communications messages from said ad hoc network, said incoming messages containing said mobile unit traffic characterization data;
   a signal strength detection system for determining a signal strength of said incoming communications message;
   a vehicle monitor for determining a differential speed of said mobile unit, said differential speed having a pre-defined relationship to said mobile unit traffic characterization data;
   a message creation system for creating an outgoing communications message, said outgoing communications message including said mobile unit traffic characterization data; and
   a timer for scheduling execution of said message creation system for periodically transmitting said mobile unit traffic characterization data.

7. The traffic condition alert system as in claim 1 wherein said mobile unit status is selected from a group consisting of JAMMED and NOT JAMMED.

8. The traffic condition alert system as in claim 1 wherein said mobile unit traffic characterization protocol system further comprises:
   a procedure control system for controlling said sequencing; and
   a traffic characterization database for retaining mobile unit traffic characterization data.

9. A method for processing traffic condition alerts comprising:
   initializing an ad hoc communications network interface, said network interface having electronic connection with a mobile unit, said mobile unit having a vehicle monitor, said vehicle monitor computing traffic characterization data;
   initializing a database, said database having electronic connection with said mobile unit, said database containing a mobile unit status, said mobile unit status being related to said traffic characterization data;
   listening for incoming mobile unit traffic characterization data messages, said incoming messages arriving from said ad hoc network;
   receiving said incoming messages, said incoming messages containing location- and time-tagged mobile unit traffic characterization data;
   processing said incoming messages according to a mobile unit traffic characterization protocol;
   transmitting outgoing mobile unit traffic characterization data messages periodically over said ad hoc network according to a said mobile unit traffic characterization protocol, said outgoing messages containing said mobile unit status, a location of said mobile unit, and a timestamp;
   updating said database according to said location- and time-tagged mobile unit traffic characterization data incoming messages;
   transmitting said outgoing messages when said mobile unit status is set;
   updating said database when said mobile unit status is set; and
   creating a report, said report created on demand, said report created according to said mobile unit status.

10. The method as in claim 9 further comprising:
    resetting said mobile unit status setting when a plurality of traffic alert thresholds are met; and
    accessing at least one message timer for triggering the step of transmitting outgoing mobile unit traffic characterization data messages periodically.

11. A mobile unit for carrying out the method according to claim 9.

12. A communications network comprising at least one node according to claim 9.

13. Electromagnetic signals traveling over a computer network of mobile units comprising: said electromagnetic signals carrying information for the practice of the method of claim 9.

14. A computer readable medium containing instructions for the practice of the method of claim 9.

15. A mobile unit for processing traffic characterization data comprising:
- an ad hoc communications network interface having electronic connection with the mobile unit, said network interface enabling exchange of incoming and outgoing mobile unit traffic characterization data among mobile units on said network;
- a traffic characterization data system for receiving said incoming mobile unit traffic characterization data;
- a vehicle monitor for collecting internal mobile unit traffic characterization data;
- a mobile unit traffic characterization protocol, said mobile unit traffic characterization protocol setting a mobile unit status, said mobile unit status being a function of said incoming mobile unit traffic characterization data and said internal mobile unit traffic characterization data; and
- a report system for creating reports from said mobile unit status.

16. A communications message for exchanging mobile unit traffic characterization data using a mobile unit traffic characterization protocol, said message comprising:
- a message header, said message header formatted according to a communications protocol,
- a time- and location-tagged mobile unit traffic characterization data field, said mobile unit traffic characterization data field concatenated to said header to form a partial message; and
- a counter field for preventing system loops, said counter field concatenated to said partial message to form said communications message, said communications message formatted for electronic transmission on a communications network, said communications network connecting a plurality of mobile units one with another, said plurality of mobile units having a common understanding of said communications protocol.

17. The communications message of claim 16 wherein said mobile unit traffic characterization field further comprises:
- a message type selected from a group consisting of JAMMED and NOT JAMMED;
- a timestamp, said timestamp having a pre-defined temporal relationship with said mobile unit traffic characterization data;
- a latitude, said latitude having a pre-defined latitudinal relationship with said mobile unit traffic characterization data; and
- a longitude, said longitude having a pre-defined longitudinal relationship with said mobile unit traffic characterization data.

18. The communications message of claim 16 wherein said communications protocol comprises an ad hoc network routing protocol.

19. The communications message of claim 16 wherein each of said plurality of mobile units comprises:
- a vehicle;
- a computer installed in said vehicle;
- a Global Positioning Satellite (GPS) system, said GPS system including an antenna and a GPS interface, said GPS interface providing electronic interconnection between said antenna and said computer, said computer receiving said latitude and said longitude from said antenna through said GPS interface; and
- a wireless local area network (LAN) system, said LAN system having electronic communication with communications network, said LAN system having electronic communication with said computer, said LAN system having a LAN receiver, said LAN system having a LAN interface, said LAN interface providing electronic interconnection between said LAN receiver and said computer, said computer receiving said communications messages from said LAN receiver through said LAN interface.

* * * * *